US012106633B2

(12) United States Patent
Körmendi

(10) Patent No.: US 12,106,633 B2
(45) Date of Patent: Oct. 1, 2024

(54) METHOD FOR OPERATING AN ADD-ON GAME OF A GAMING SYSTEM

(71) Applicant: Play'n Go Marks Ltd, Sliema (MT)

(72) Inventor: Kristóf Gábor Körmendi, Sliema (MT)

(73) Assignee: Play'n Go Marks Ltd, Sliema (MT)

( * ) Notice: Subject to any disclaimer, the term of this patent is extended or adjusted under 35 U.S.C. 154(b) by 0 days.

(21) Appl. No.: 17/342,629

(22) Filed: Jun. 9, 2021

(65) Prior Publication Data

US 2021/0390829 A1 Dec. 16, 2021

(30) Foreign Application Priority Data

Jun. 10, 2020 (SE) .................................... 2050690-3

(51) Int. Cl.
*G07F 17/32* (2006.01)

(52) U.S. Cl.
CPC ...... *G07F 17/3258* (2013.01); *G07F 17/3211* (2013.01); *G07F 17/3227* (2013.01); *G07F 17/3237* (2013.01)

(58) Field of Classification Search
CPC ........................................................ G07F 17/34
USPC ............................................................ 463/27
See application file for complete search history.

(56) References Cited

U.S. PATENT DOCUMENTS

| | | | | |
|---|---|---|---|---|
| 7,963,847 | B2 | 6/2011 | Baerlocher | |
| 8,628,397 | B2 | 1/2014 | Kusuda et al. | |
| 2004/0142741 | A1 | 7/2004 | Walker et al. | |
| 2007/0105619 | A1 * | 5/2007 | Kniesteadt | G07F 17/34 463/26 |
| 2013/0072294 | A1 | 3/2013 | Mosley et al. | |
| 2013/0331181 | A1 | 12/2013 | Newton et al. | |
| 2014/0057712 | A1 | 2/2014 | Cannon | |
| 2014/0087851 | A1 | 3/2014 | Low et al. | |
| 2015/0161850 | A1 | 6/2015 | Mosley et al. | |
| 2017/0061737 | A1 | 3/2017 | Mosley et al. | |
| 2017/0092074 | A1 * | 3/2017 | Watkins | G07F 17/3211 |
| 2019/0051098 | A1 * | 2/2019 | Tran | G07F 17/3246 |
| 2022/0237986 | A1 * | 7/2022 | Watkins | G07F 17/3267 |

OTHER PUBLICATIONS

Swedish Search Report dated Mar. 17, 2021 for Swedish Application No. 2050690-3, 3 pages.
Extended European Search Report dated Oct. 1, 2021 for European Patent Application No. 21178549.8, 8 pages.

* cited by examiner

*Primary Examiner* — Pierre E Elisca
(74) *Attorney, Agent, or Firm* — RMCK Law Group, PLC

(57) ABSTRACT

The present disclosure relates to a computer implemented method performed by a gaming system. In particular, the present disclosure relates to a method for operating an add-on game of a gaming system. The present disclosure also relates to a corresponding gaming system and a computer program product.

16 Claims, 4 Drawing Sheets

METHOD FOR OPERATING AN ADD-ON GAME OF A GAMING SYSTEM

CROSS-REFERENCE TO RELATED APPLICATIONS

This application claims priority to Swedish Patent Application No. 2050690-3, filed on Jun. 10, 2020. The disclosure of the above application is incorporated herein by reference in its entirety.

TECHNICAL FIELD

The present disclosure relates to a computer implemented method performed by a gaming system. In particular, the present disclosure relates to a method for operating an add-on game of a gaming system. The present disclosure also relates to a corresponding gaming system and a computer program product.

BACKGROUND

Games of chance are known and widely played for recreational purposes. The gaming industry has come to recognize that to sustain long term success it must be constantly innovative in introducing new games and new gambling concepts to the gaming public. One example of this innovating drive can be appreciated in the embrace of the Internet and online gaming by the gaming industry.

A common trend within the online gaming industry is to provide potentially new and current players with new means to for attracting and ensuring that players remain at the online site providing the games. An example of such a means is the use of jackpots schemes. Jackpots schemes are used to encourage players to join a specific game, since the jackpot scheme potentially could increase the payout with playing that specific game.

Even though the presently available jackpot schemes may direct the players to a specific game, it could potentially be advantageous to allow an operator of the game to be given an increase amount of control of how the jackpot scheme is executed. Accordingly, there is a need for a more comprehensive method for allowing an increased operational control of when and how players are to participate in a game, using the jackpot scheme as a direct motivator for the players participation.

SUMMARY

According to an aspect of the present disclosure, the above is at least partly met by a computer implemented method performed by a gaming system, the gaming system comprising a server arranged in communication with a plurality of electronic user devices using a network connection, wherein the method comprises the steps of receiving, at the server, requests from a portion of the plurality of electronic user devices to participate in a first game, forming, at the server, a game duration having a game end time, initiating, at the server, an add-on game for a selected set of the electronic user devices participating in the first game, the add-on game relating to the first game, determining, at the server, a current probability of winning the add-on game, where the probability is dependent on a current time in relation to the game end time, determining, at the server, an outcome of the add-on game based on the current probability for a successful outcome of the add-on game, selecting, at the server, one of the set of electronic user devices participating in the first game as a winner of the add-on game if the gaming outcome is positive, and distributing, from the server to the selected one electronic user device, an award relating to the add-on game.

The general concept of the present disclosure is based on the fact that it may be possible to improve the control of when players operating individual electronic user devices are participating in the first game, by allowing an add-on game to have probability of resulting in an award for at least one of the players to be targeted in such a way that the players rather play at a specific time frame, rather than within another time frame.

In some embodiments of the present disclosure the first game is a game of chance, such as for example a slot game played by players each operating one of the plurality of electronic user devices. The concept according to the present disclosure may however be applied to other types of games, including e.g. sports betting or similar. Accordingly, within the scope of the present disclosure it should be understood that the expression "first game" should be interpreted broadly. For example, in some embodiments the expression first game could potentially include not only a single game but a set of games, such as a plurality of games.

An advantage following the present concept is thus that an operator of the game (not a player but rather e.g. an owner of the server) in a fairly distinct way may control when an outcome of the add-on game is to be successful. Accordingly, the operator of the game may influence the time-based probability to be within a time frame that for some reason is advantageous for the operator.

Thus, since the probability is dependent on a current time (i.e. the time right now) in relation to the game end time, it may be possible for the operator to select the end time and thereby control when the outcome of the add-on game is likely to be successful. In a typical implementation of the present disclosure the current probability of a successful outcome of the add-on game is inversely dependent on a difference between the game end time and the current time. Accordingly, as the time progresses from when the add-on game is initiated, the probability is increasing (in relation to the game end time).

In some embodiments of the present disclosure the probability is linearly increasing from 0 to 100% as time progresses towards the game end time. However, it may be possible to allow the increase to be progressive, e.g. logarithmic, squared, etc. Furthermore, it may also be possible and within the scope of the present disclosure to allow the increase (linear or progressive) to have different "end points", such as not necessarily starting from 0 and not necessarily going all the way up to 100%. For example, in some embodiments the upper end point may be 99.97%.

It may instead (or also) be possible to allow the current probability for a successful outcome of the add-on game is increased if the outcome of the add-on game is negative. This effectively would result in that an increasing number of outcome determinations will increase the chance of success, also seen over time in relation to the game end time. That is, the more times the first game is played by the players operating the electronic user devices the higher the probability of a successful outcome of the add-on game.

As indicated above, it may of course possible to combine these two ways of controlling the probability of a successful outcome of the add-on game. In any way, it should be understood that it also may be possible (and within the scope of the present disclosure) to allow the current probability of a successful outcome of the add-on game to be dependent on a difference between the game end time and the current time, i.e. conversely to the discussion above. As is understood, such an implementation would result in a higher probability when initiating the add-on game as compared to at the game end time, where the probability thus would decrease over time.

In an embodiment of the present disclosure, the determination of the outcome of the add-on game is further based on an at least partly random parameter. Accordingly, the probability of a successful outcome will typically in part be based on chance. Within the scope of the present disclosure the partly random parameter should be understood to be e.g. semi-random, pseudo-random or fully random. The determination of the outcome may thus in this typical embodiment be implemented at the server by means of a time-based random generator algorithm.

Furthermore, in some embodiments of the present disclosure the award is at least partly dependent on a predetermined ratio of bets provided by the set of electronic user devices when participating in the first game. Accordingly, the players participating in the first game may in such an embodiment at least partly by themselves control e.g. a size of the award. As an example, if a player is participating in the first game a portion of a bet made by the player will be provided as a contribution to the award. As a result, the more player that plays the first game the higher the award for the add-on game.

In some embodiments it may be possible to arrange the server to receive a first control parameter, where the first control parameter is arranged to define the predetermined ratio. The first control parameter may for example be provided by the operator, for example using an operator interface provided at an electronic device under the control of the operator.

Possibly, the method may in some embodiments be adapted to further comprise the step of receiving, at the server, a third control parameter defining the game duration and the game end time. Accordingly, e.g. the operator may be allowed to also control the game duration and the game end time using the mentioned operator interface.

In some embodiments it may be possible to set the predetermined ratio to between 2-5% of the bet provided by the player when participating in the first game. It should however be understood that the predetermined ratio may be both lower and higher as compared to the above exemplary predetermined ratio. In addition, it may be possible to allow the predetermined ratio to be dynamic, for example allowing the predetermined ratio to increase over time, such that the player will provide a greater contribution to the award as time progresses and getting closer to the game end time.

In a possible embodiment of the present disclosure, the method may further comprise the step of forming, at the server, a second control parameter, wherein the step of determining the current probability for a successful outcome of the add-on game is further based on the second control parameter, and the bonus control parameter is provided for adapting the current probability for a successful outcome of the add-on game. The second control parameter may in some embodiments be used for allowing e.g. the operator to provide a "base probability" for successful outcome of the add-on game. The base probability may for example be set to be between 0.005-0.02%. As discussed above, it should be understood that the base probability may be both lower and higher as compared to the above exemplary base probability. The base probability is typically combined with the time-based probability.

Furthermore, in some embodiments it may be advantageously to allow the game duration to comprise a plurality of time-brackets. Such time-brackets may for example divide the game duration into a finite number of equally sized time-brackets, such as for example four different time-brackets. The time-brackets may in turn for example be used for each defining an increase in the current probability for a successful outcome of the add-on game. As an example, it may be possible to allow the first time-bracket (of the four time-brackets) to have a first probability, the second time-bracket to have a second probability being higher than the first probability, etc.

Preferably, the plurality of electronic user devices are each provided with a display unit adapted to present a graphical user interface (GUI), and the method further comprises the step of forming, at the server, a graphical representation of a current status of the add-on game, and distributing, from the server to at least the set of electronic user devices participating in the first game, the graphical representation.

Within the context of the present disclosure the expression "forming a graphical representation of a current status of the add-on game" should be interpreted broadly. Specifically, it should be understood that the server in some embodiment may be configured to only form a collection of "meta-data" (here corresponding to the graphical representation) that will be rendered at the frontend, such as within the GUI of the electronic user device. However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it should be understood that displaying of the graphical representation of the current status of the add-on game must not necessary include displaying all information, but rather in some embodiment only a (e.g. relevant) portion of the add-on game is displayed. It may for example be possible to select only a portion of the add-on game where the specific user is present and display this portion to the user. It may also or additionally be possible to allow the graphical representation to be set differently for different game operators, players or groups of players. The graphical representation may also be dependent on e.g. the geographical location of the players, such as dependent on city, country or continent where the player is located/registered.

Within the context of the present disclosure it should be understood that it in some embodiments may be so that only some of the plurality of electronic user devices that participate in first game also participate in the add-on game. A player could potentially opt-out from participating in the add-on game. It could likewise be possible, and within the scope of the present disclosure to allow the participation in the add-on game to be further dependent on at least one of a relation to an operator of the game, a group relation for the electronic user device and a geographical location of each electronic user device. Possibly the geographical location may be selected from a group comprising a city, a country and a continent.

The geographical location may then be used for selecting, at the server, the set of the electronic user devices participating in the first game. It may potentially also be possible to select the set of electronic user devices participating in the first game fully or partly randomly.

According to another aspect of the present disclosure there is provided a gaming system comprising a server arranged in communication with a plurality of electronic user devices using a network connection, wherein the server is adapted to receive requests from a portion of the plurality of electronic user devices to participate in a first game, form a game duration having a game end time, initiate an add-on game for a selected set of the electronic user devices participating in the first game, the add-on game relating to the first game, determine a current probability of winning the add-on game, where the probability is dependent on a current time in relation to the game end time, determine an outcome of the add-on game based on the current probability for a successful outcome of the add-on game, select one of the set of electronic user devices participating in the first game as a winner of the add-on game if the gaming outcome is positive, and distribute, to the selected one electronic user device, an award relating to the add-on game. This aspect of the present disclosure provides similar advantages as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product computer program product comprising a computer readable medium having stored thereon computer program means for operating a gaming system, the gaming system comprising a server arranged in communication with a plurality of electronic user devices using a network connection, wherein the computer program product comprises code for receiving, at the server, requests from a portion of the plurality of electronic user devices to participate in a first game, code for forming, at the server, a game duration having a game end time, code for initiating, at the server, an add-on game for a selected set of the electronic user devices participating in the first game, the add-on game relating to the first game, code for determining, at the server, a current probability of winning the add-on game, where the probability is dependent on a current time in relation to the game end time, code for determining, at the server, an outcome of the add-on game based on the current probability for a successful outcome of the add-on game, code for selecting, at the server, one of the set of electronic user devices participating in the first game as a winner of the add-on game if the gaming outcome is positive, and code for distributing, from the server to the selected one electronic user device, an award relating to the add-on game. Also this aspect of the present disclosure provides similar advantages as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
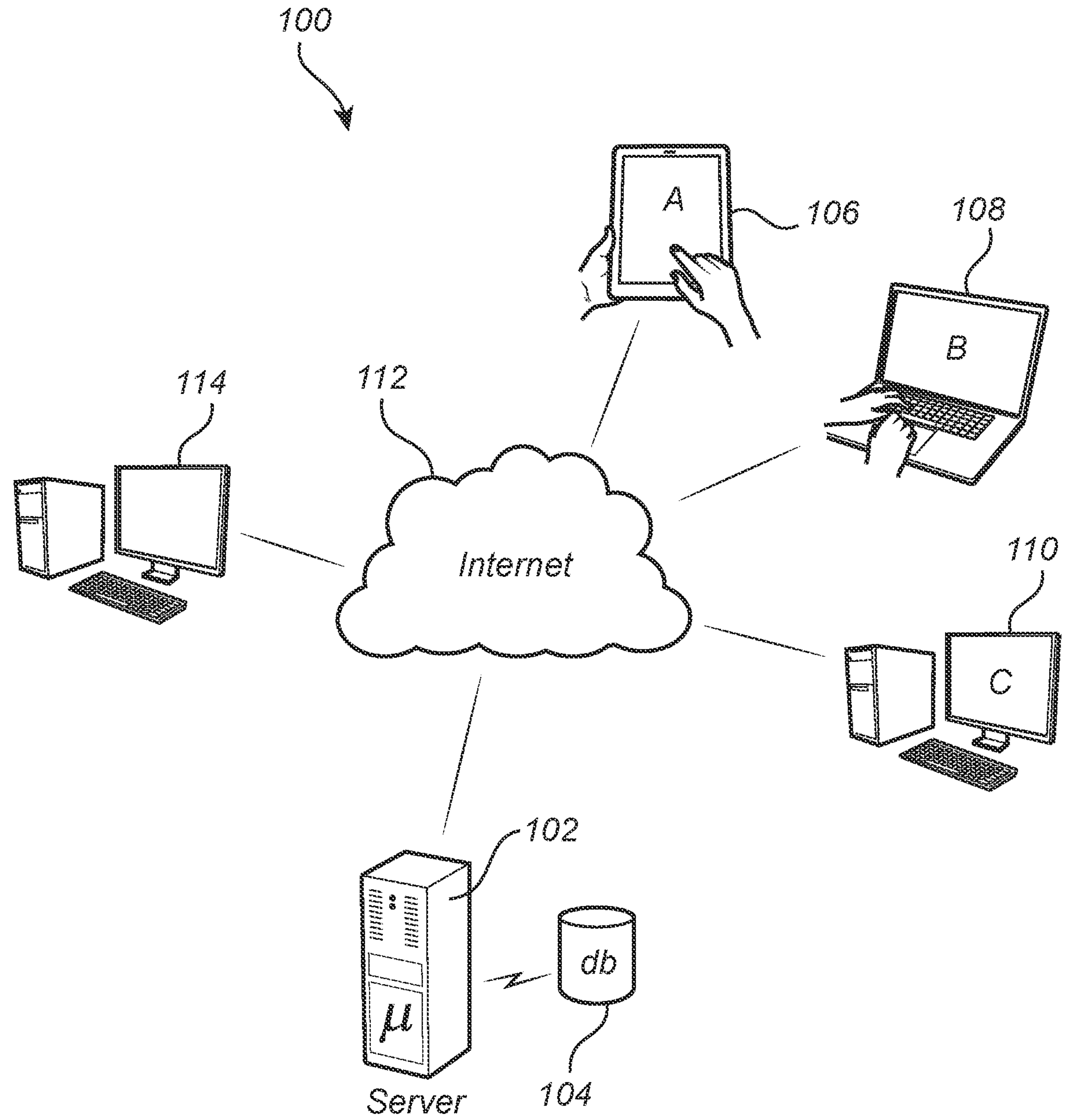
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc.

Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

The gaming system 100 further comprises a further electronic device 114, allowing e.g. an operator of the gaming system 100 to e.g. control parameters for games to be played by the players using the client devices 106, 108, 110.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
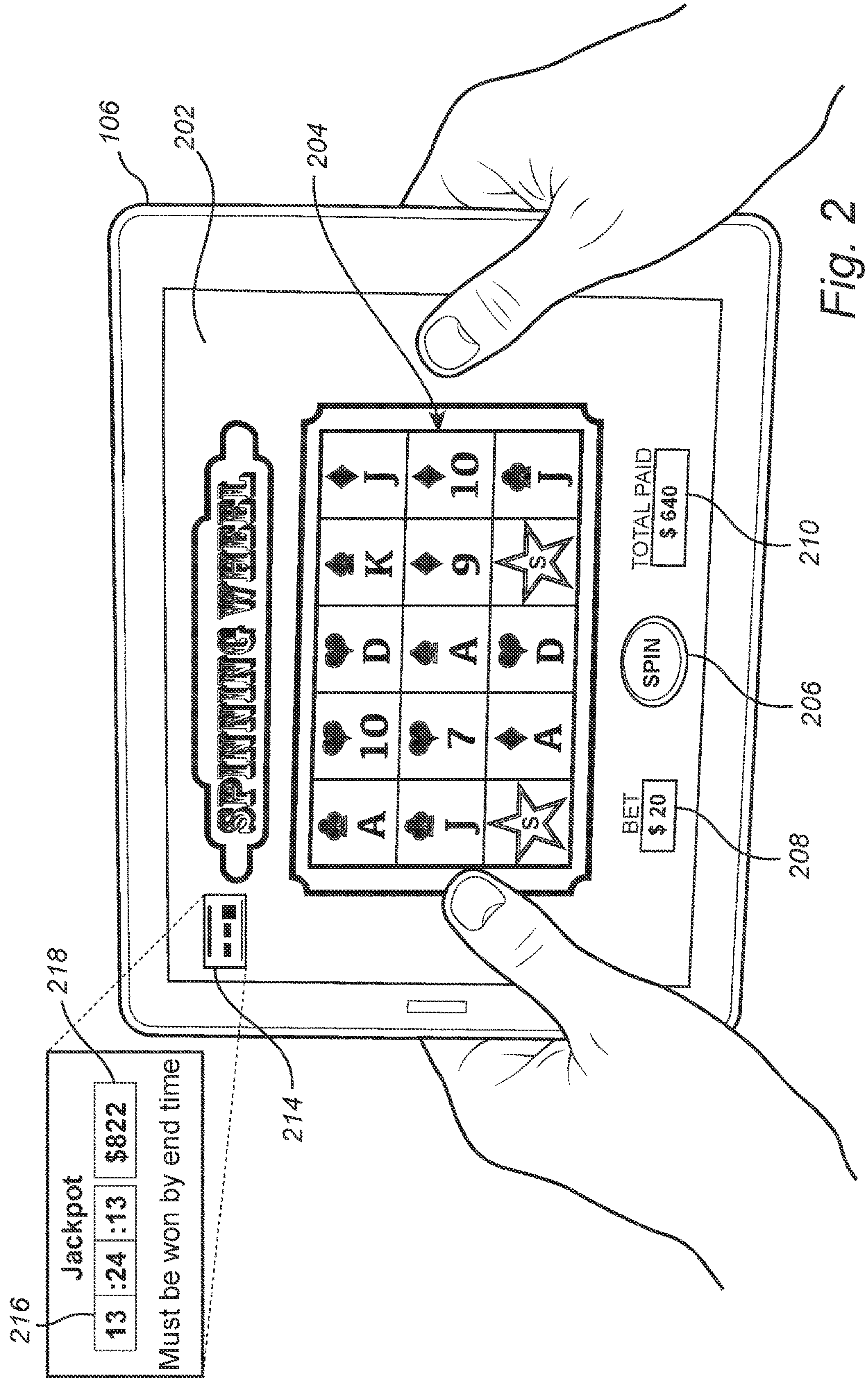
FIG. 2 provides an exemplary illustration of a typical graphical user interface (GUI) for use in playing a game.

Turning now to FIG. 2 illustrating a graphical user interface (GUI) 202 to be displayed at one of the above discussed client devices 106, 108, 110, in the illustrated embodiment provided as an application ("app") or within e.g. a web browser of the portable client device 106 being a tablet. The online game of chance, also referred to as the first game, to be played within the GUI is in the exemplary illustration a slot game, visualized within the GUI 202 as comprising five individual reels 204 provided with a plurality of different symbols (and various lines). The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

The GUI 202 further comprises an add-on game portion 214, presenting information to the user of the client devices 106, 108, 110, indicating a progress of an add-on game in accordance to the present disclosure, where the add-on game is provided as an addition to the first game. The add-on game portion 214 is in FIG. 2 shown to comprise a first indicator 216 relating to a time until the game end time, as well as a second indicator 218 presenting a current award in case of winning the add-on game.

Figure 3A:
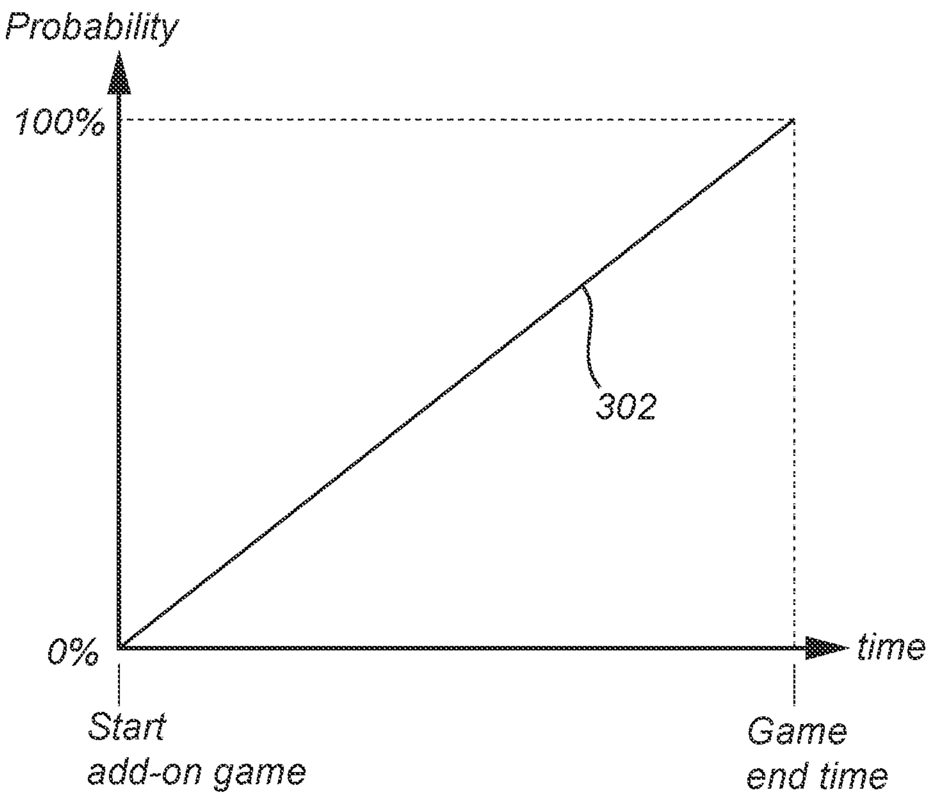
FIGS. 3A and 3B shows exemplary curves for the probability of a successful outcome of the add-on game provided in line with the present disclosure.
Figure 3B:
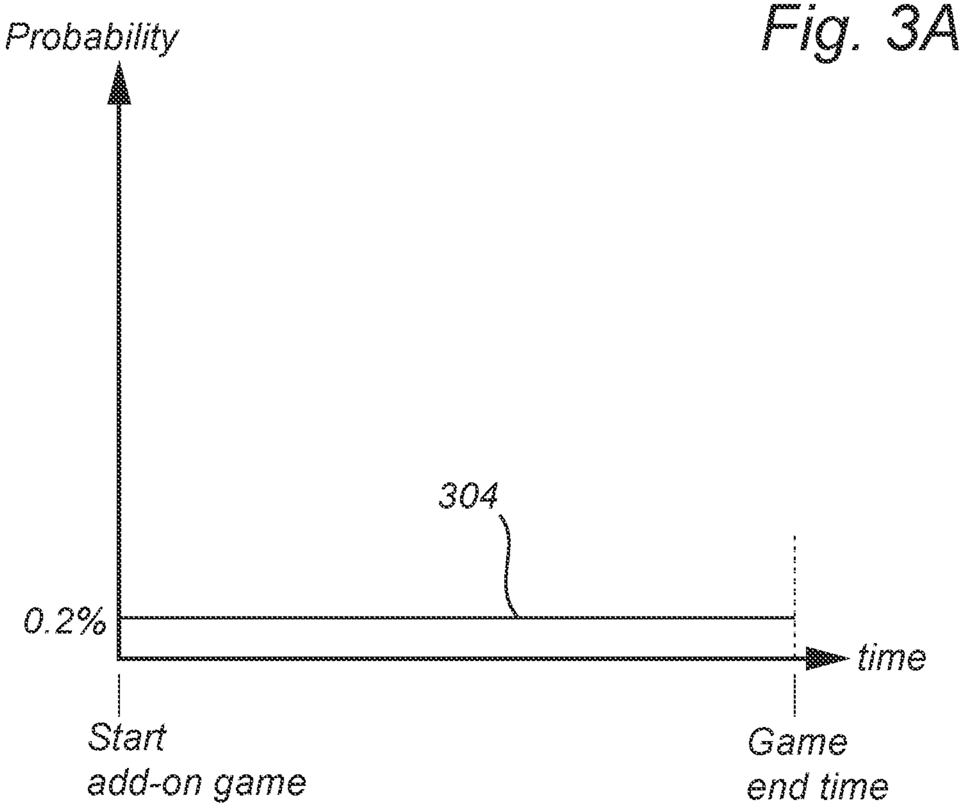
Figure 4:
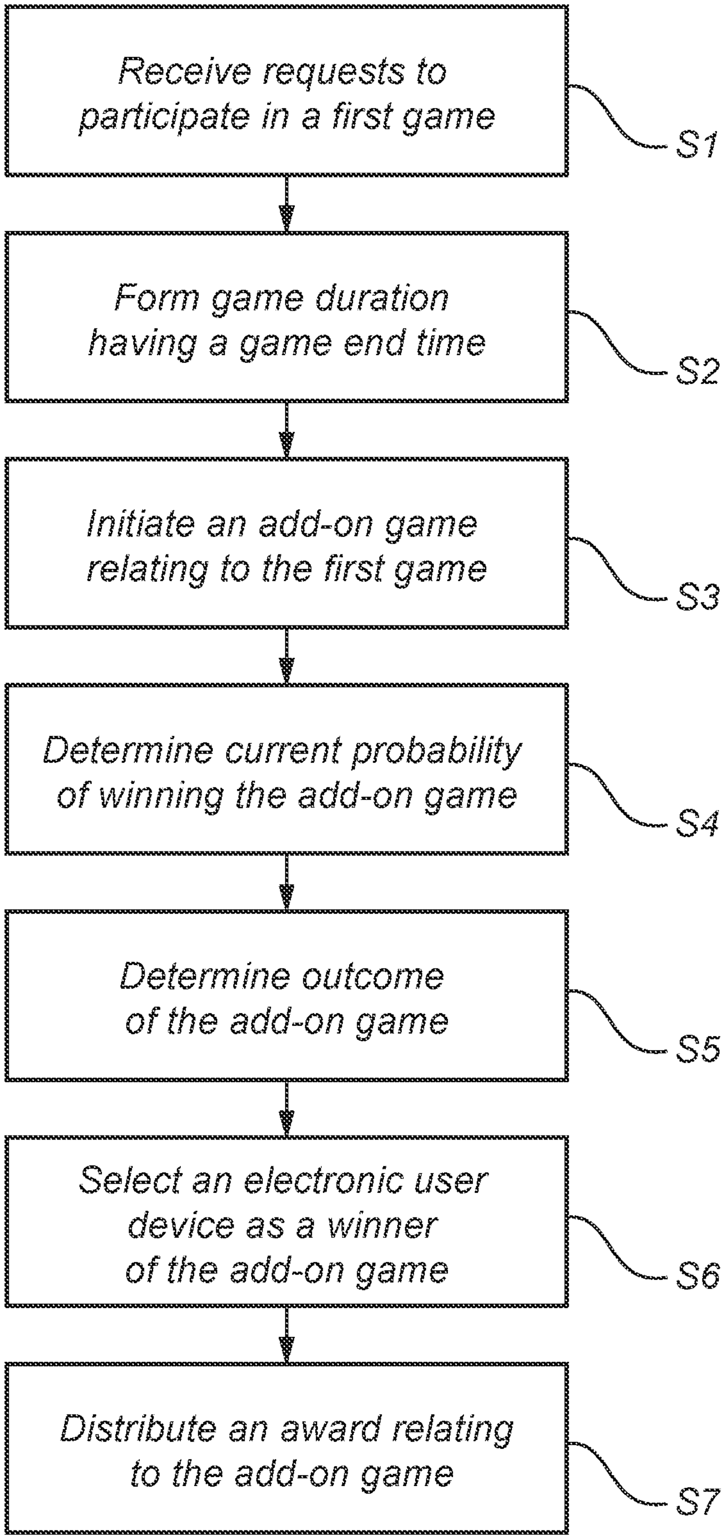
FIG. 4 is a flow chart illustrating the exemplary steps for operating the gaming system as shown in FIG. 1.

During operation gaming system 100, with further reference to FIGS. 3A, 3B and 4, the server 102 receives, S1, requests the client devices 106, 108, 110 to participate in the first game, for example the slot game as discussed above. As mentioned above, a large plurality of client devices may be connected to the server 102, however it may be so that only a selected portion of the server-connected client devices participates in the first game. Accordingly, the remaining server-connected client devices may be either not participating in any game at the moment or may participate in another game. It should further be understood that it may be possible to allow the of the portion of the server-connected client devices to be randomly selected, selected based on the game operator, selected based on a geographical location, etc.

The operator of the gaming system 100 may dictate that the add-on game according to the present disclosure is exclusive to client devices used for participating in a specific (first) game. However, it may also be possible and within the scope of the present disclosure to allow multiple different games to be defined as the first game, meaning that client devices used for participating in many different games may share the same add-on game.

The server 102 will also receive, S2, a game duration having a game end time. The game duration and the game end time may in some embodiments be provided by the operator using the further electronic device 114. The game duration and the game end time may in some embodiments be set only once and the progress for a predetermined time period. That is, it could potentially be possible to set the game duration to be set to 24 hours and then allow the game duration to again restart after the 24 hours have passed (i.e. at the game end time). It should be understood that 24 hours is just an example and the game duration could be shorter as well as longer.

Completely opposite, the operator may set the game duration and the game end time only allowing the add-on game to be performed once. The operator would then have to again set a new game duration and the game end time.

With information about the client devices 106, 108, 110 participating in the first game, the game duration and the game end time, the server 102 will initiate, S3, the add-on game for a selected set of the client devices 106, 108, 110 participating in the first game. Typically, it is a prerequisite that only client devices 106, 108, 110 participating in the first game are selected to also participate in the add-on game. It may also be possible, and within the scope of the present disclosure, to set further prerequisites to be selected to also participate in the add-on game. Such further prerequisites may for example include a minimum bet placed by a player of a client device 106, 108, 110 as well as optionally the mentioned geographical location (or relation) or a country of registration of a player of a client device 106, 108, 110. The country of registration may for example be where the player has joined the game, such as when a player is located in a country not necessarily being a country where the player is a national.

For example, players having e.g. a specific nationality or country of registration may be allowed to joint or not join the add-on game, for example dependent on national jurisdictions dictating if add-on games as presented in line with the present disclosure are allowed to be played.

The server 102 will the determine, S4, a current probability of winning the add-on game, where the probability is dependent on a current time in relation to the game end time. FIG. 3A present one typical example of a curve 302 where the probability for a successful outcome of the add-on game shown as being inversely dependent on a difference between the game end time and the current time, i.e. the shorter the time to the game end time the higher the probability for a successful outcome of the add-on game. In FIG. 3A the increase in probability is shown to be linear, meaning that the probability for a successful outcome of the add-on game will linearly increase over time (up until the end time).

With reference to FIG. 3B, it should be understood that it optionally may be possible to implement some form of "base probability" in combination to the e.g. time-based (increasing) probability. In FIG. 3B the base probability is exemplary set to 0.2%, however the base probability may be set both lower and higher.

The current probability, in this embodiment being a combination of the base probability and the time-based probability will thus start at the exemplary 1% when the add-on game is stated. However, the current probability at the game end time will not exceed 100%.

For determining, S5, an outcome of the add-on game the server 102 may for example implement (pseudo-) random generator algorithm that takes into account the current probability for a successful outcome of the add-on game when determining the outcome of the add-on game. Accordingly, the server 102 implements a random (or semi- or pseudo-) component to be combined with the e.g. increasing probability of the outcome of the add-on game to be successful. The random generator algorithm implemented by the server 102 may thus be seen as a time-based random generator algorithm, where e.g. the probability of a successful outcome is increased over time and the closer the current time gets to the game end time.

The determination of the outcome of the add-on game is preferably directly connected to a specific client device 106, 108, 110, being one of the set of electronic user devices participating in the first game. For example, each time a player operating a client device 106, 108, 110 makes a bet (above a predetermined lowest bet level) and pushes the spin button 206, the server 102 executes the outcome determination step. Accordingly, as a result of the outcome determination step being made in relation to a specific client device 106, 108, 110, the server 102 will select, S6, the specific client device 106, 108, 110 as a winner of the add-on game if the gaming outcome is positive.

The server will subsequently distribute, S7, the award relating to the add-on game to the specific client device 106, 108, 110. This may in some embodiments result in an increase of the total payment to the player 210, in case the award being monetary. The award could of course be differently arranged, being possibly of physical presence.

In summary, the present disclosure relates to a computer implemented method performed by a gaming system, the gaming system comprising a server arranged in communication with a plurality of electronic user devices using a network connection, wherein the method comprises the steps of receiving, at the server, requests from a portion of the plurality of electronic user devices to participate in a first game, forming, at the server, a game duration having a game end time, initiating, at the server, an add-on game for a selected set of the electronic user devices participating in the first game, the add-on game relating to the first game, determining, at the server, a current probability of winning the add-on game, where the probability is dependent on a current time in relation to the game end time, determining, at the server, an outcome of the add-on game based on the current probability for a successful outcome of the add-on game, selecting, at the server, one of the set of electronic user devices participating in the first game as a winner of the add-on game if the gaming outcome is positive, and distributing, from the server to the selected one electronic user device, an award relating to the add-on game.

Advantages with the present disclosure includes an improved attraction to the gaming concept as well as the possibility for an operator of the game (not a player but rather e.g. an owner of the server) in a fairly distinct way may control when an outcome of the add-on game is to be successful. Accordingly, the operator of the game may influence the time-based probability to be within a time frame that for some reason is advantageous for the operator.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A computer implemented method performed by a gaming system, the gaming system comprising a server arranged in communication with a plurality of electronic user devices using a network connection, each of the plurality of electronic user devices including a display unit configured to present a graphical user interface (GUI), wherein the method comprises the steps of:

receiving, at the server, requests from a portion of the plurality of electronic user devices to participate in a first game, forming, at the server, a game duration having a predetermined game end time, the game duration comprising a plurality of time-brackets, wherein the game end time is controlled by the server, initiating, at the server, an add-on game for a selected set of the electronic user devices participating in the first game, the add-on game relating to the first game, wherein the add-on game comprises a displayable add-on game portion including: (i) a first indicator relating to a time until the game end time, and (ii) a second indicator presenting a current award in case of winning the add-on game, determining, at the server, a current probability of winning the add-on game, wherein the probability is dependent on a current time in relation to the predetermined game end time, and the time-brackets each define an increase in the current probability for a successful outcome of the add-on game, determining, at the server and upon receiving a bet, for the first game, from a particular electronic user device participating in the first game, an outcome of the add-on game for that particular electronic user device based on the current probability for a successful outcome of the add-on game, wherein the current probability for a successful outcome of the add-on game is:

inversely dependent on a difference between the game time and the current time, increased if the outcome of the add-on game is negative, and/or dependent on a difference between the predetermined game end time and the current time, such that the current probability for the successful outcome increases as the current time approaches the predetermined game end time, selecting, at the server, the particular electronic user device as a winner of the add-on game if the gaming outcome is positive, distributing, from the server to the particular one electronic user device, an award relating to the add-on game, wherein the award is at least partly dependent on a predetermined ratio of bets provided by the set of electronic user devices participating in the first game, forming, at the server, a graphical representation of a current status of the add-on game, the graphical representation including the displayable add-on game portion, and distributing, from the server to at least the set of electronic user devices participating in the first game, the graphical representation in real-time such that the displayable add-on game portion is accurate.

2. The method according to claim 1, wherein the determination of the outcome of the add-on game is further based on an at least partly random parameter.

3. The method according to claim 1, further comprising the step of:

receiving, at the server, a first control parameter defining the predetermined ratio.

4. The method according to claim 1, further comprising the step of:

forming, at the server, a second control parameter, wherein the step of determining the current probability for a successful outcome of the add-on game is further based on the second control parameter, and the second control parameter is provided for adapting the current probability for a successful outcome of the add-on game.

5. The method according to claim 1, further comprising the step of:

receiving, at the server, a third control parameter defining the game duration and the predetermined game end time.

6. The method according to claim 1, wherein participation in the add-on game is further dependent on at least one of a relation to an operator of the game, a group relation for the electronic user device and a geographical location of each electronic user device.

7. The method according to claim 6, wherein the geographical location is selected from a group comprising a city, a country and a continent.

8. The method according to claim 1, wherein the first game is a game of chance.

9. A gaming system comprising a server arranged in communication with a plurality of electronic user devices using a network connection, each of the plurality of electronic user devices including a display unit configured to present a graphical user interface (GUI), wherein the server is adapted to:

receive requests from a portion of the plurality of electronic user devices to participate in a first game, form a game duration having a predetermined game end time, the game duration comprising a plurality of time-brackets, wherein the game end time is controlled by the server, initiate an add-on game for a selected set of the electronic user devices participating in the first game, the add-on game relating to the first game, wherein the add-on game comprises a displayable add-on game portion including: (i) a first indicator relating to a time until the game end time, and (ii) a second indicator presenting a current award in case of winning the add-on game, determine a current probability of winning the add-on game, wherein the probability is dependent on a current time in relation to the predetermined game end time, and the time-brackets each define an increase in the current probability for a successful outcome of the add-on game, determine upon receiving a bet, for the first game, from a particular electronic user device participating in the first game an outcome of the add-on game for that particular electronic user device based on the current probability for a successful outcome of the add-on game, wherein the current probability for a successful outcome of the add-on game is:

inversely dependent on a difference between the game time and the current time, increased if the outcome of the add-on game is negative, and/or dependent on a difference between the predetermined game end time and the current time, such that the current probability for the successful outcome increases as the current time approaches the predetermined game end time, select the particular electronic user device as a winner of the add-on game if the gaming outcome is positive, distribute, to the particular one electronic user device, an award relating to the add-on game, wherein the award is at least partly dependent on a predetermined ratio of bets provided by the set of electronic user devices participating in the first game, form a graphical representation of a current status of the add-on game, the graphical representation including the displayable add-on game portion, and distribute, to at least the set of electronic user devices participating in the first game, the graphical representation in real-time such that the displayable add-on game portion is accurate.

10. The gaming system according to claim 9, wherein the determination of the outcome of the add-on game is further based on an at least partly random parameter.

11. The gaming system according to claim 9, wherein the server is further adapted to receive a first control parameter defining the predetermined ratio.

12. The gaming system according to claim 9, wherein the server is further adapted to form a second control parameter, the determining the current probability for a successful outcome of the add-on game is further based on the second control parameter, and the second control parameter is provided for adapting the current probability for a successful outcome of the add-on game.

13. The gaming system according to claim 9, wherein the server is further adapted to:

receiving a third control parameter defining the game duration and the predetermined game end time.

14. The gaming system according to claim 9, wherein participation in the add-on game is further dependent on at least one of a relation to an operator of the game, a group relation for the electronic user device and a geographical location of each electronic user device.

15. The gaming system according to claim 14, wherein the geographical location is selected from a group comprising a city, a country and a continent.

16. A computer program product comprising a non-transitory computer readable medium having stored thereon a computer program for operating a gaming system, the gaming system comprising a server arranged in communication with a plurality of electronic user devices using a network connection, each of the plurality of electronic user devices including a display unit configured to present a graphical user interface (GUI), wherein the computer program product comprises:

code for receiving, at the server, requests from a portion of the plurality of electronic user devices to participate in a first game, code for forming, at the server, a game duration having a predetermined game end time, the game duration comprising a plurality of time-brackets, wherein the game end time is controlled by the server, code for initiating, at the server, an add-on game for a selected set of the electronic user devices participating in the first game, the add-on game relating to the first game, wherein the add-on game comprises a displayable add-on game portion including: (i) a first indicator relating to a time until the game end time, and (ii) a second indicator presenting a current award in case of winning the add-on game, code for determining, at the server, a current probability of winning the add-on game, wherein the probability is dependent on a current time in relation to the predetermined game end time, and the time-brackets each define an increase in the current probability for a successful outcome of the add-on game, code for determining, at the server and upon receiving a bet, for the first game, from a particular electronic user device participating in the first game, an outcome of the add-on game for that particular electronic user device based on the current probability for a successful outcome of the add-on game, wherein the current probability for a successful outcome of the add-on game is:

inversely dependent on a difference between the game time and the current time, increased if the outcome of the add-on game is negative, and/or dependent on a difference between the predetermined game end time and the current time, such that the current probability for the successful outcome increases as the current time approaches the predetermined game end time, code for selecting, at the server, the particular electronic user device as a winner of the add-on game if the gaming outcome is positive, code for distributing, from the server to the particular one electronic user device, an award relating to the add-on game, wherein the award is at least partly dependent on a predetermined ratio of bets provided by the set of electronic user devices participating in the first game, code for forming, at the server, a graphical representation of a current status of the add-on game, the graphical representation including the displayable add-on game portion, and code for distributing, from the server to at least the set of electronic user devices participating in the first game, the graphical representation in real-time such that the displayable add-on game portion is accurate.

* * * * *